(12) United States Patent
Schneider et al.

(10) Patent No.: US 9,632,673 B1
(45) Date of Patent: Apr. 25, 2017

(54) CYBER DOMAIN VISUALIZATION SYSTEMS AND METHODS

(71) Applicant: Telos Corporation, Ashburn, VA (US)

(72) Inventors: Jeffrey R. Schneider, Leesburg, VA (US); Rosario Ramil C. Alfonso, Ashburn, VA (US); Stephen P. Corcoran, Valrico, FL (US)

(73) Assignee: Telos Corporation, Ashburn, VA (US)

(*) Notice: Subject to any disclaimer, the term of this patent is extended or adjusted under 35 U.S.C. 154(b) by 193 days.

(21) Appl. No.: 14/303,888

(22) Filed: Jun. 13, 2014

Related U.S. Application Data

(60) Provisional application No. 61/834,961, filed on Jun. 14, 2013.

(51) Int. Cl.
| | |
|---|---|
| *G06F 3/048* | (2013.01) |
| *G06F 3/0484* | (2013.01) |
| *G06F 3/0481* | (2013.01) |
| *H04L 29/06* | (2006.01) |
| *G06F 21/55* | (2013.01) |
| *G06F 17/30* | (2006.01) |

(52) U.S. Cl.
CPC ........ *G06F 3/04842* (2013.01); *G06F 3/0481* (2013.01); *G06F 17/3087* (2013.01); *G06F 17/30994* (2013.01); *G06F 21/55* (2013.01); *H04L 63/14* (2013.01)

(58) Field of Classification Search
CPC ...... G06F 21/55–21/57; G06F 17/3087; G06F 17/30994; H04L 63/14–63/1491
See application file for complete search history.

(56) References Cited

U.S. PATENT DOCUMENTS

| | | | | |
|---|---|---|---|---|
| 7,162,528 B1* | 1/2007 | Simonoff | ............... | G06Q 10/10 709/205 |
| 8,091,130 B1* | 1/2012 | McConnell | ......... | H04L 41/0677 726/23 |
| 9,347,777 B2* | 5/2016 | Schneider | ............ | G05D 1/0088 |

(Continued)

OTHER PUBLICATIONS

ArcGIS Help 10.1 website, retrieved from resources.arcgis.com/en/help/main/10.1/, partial transcript attached, relied upon portions published on and before Aug. 20, 2013 (see dates at the end of each section), 497 pages.*

(Continued)

*Primary Examiner* — Weilun Lo
*Assistant Examiner* — Patrick Ramsey
(74) *Attorney, Agent, or Firm* — Miles & Stockbridge P.C.

(57) ABSTRACT

An application program window for a graphical user interface is provided that can include a geospatial data view panel adapted to display a geospatial view based on one or more data sources selected for display, the geospatial view being updated in real-time based on updates received for the one or more data sources selected for display. The window can include a data source panel adapted to display a plurality of available data sources and, for one or more of the available data sources, one or more hyperlinks that, upon user selection, serve to update the geospatial view. The window can include a timeline panel adapted to display one or more controls that, upon user selection, serve to initiate playback of a timeline enabled geospatial view by the geospatial data view panel, the timeline enabled geospatial view comprising a sequence of views spanning a period of time.

14 Claims, 14 Drawing Sheets

(56) References Cited

U.S. PATENT DOCUMENTS

| | | | | |
|---|---|---|---|---|
| 2005/0012743 | A1* | 1/2005 | Kapler | G06F 17/30064 345/419 |
| 2006/0238538 | A1* | 10/2006 | Kapler | G06Q 10/06 345/440 |
| 2007/0277111 | A1* | 11/2007 | Bennett | G06F 3/04812 715/763 |
| 2011/0295643 | A1* | 12/2011 | Miller | G06Q 10/06 705/7.23 |
| 2012/0038633 | A1* | 2/2012 | Clark | G06T 17/05 345/419 |
| 2012/0089920 | A1* | 4/2012 | Eick | G08G 1/20 715/739 |
| 2013/0174259 | A1* | 7/2013 | Pearcy | H04L 41/0893 726/25 |
| 2013/0218890 | A1* | 8/2013 | Fernandes | G06Q 50/163 707/736 |
| 2013/0227689 | A1* | 8/2013 | Pietrowicz | G01R 1/20 726/23 |
| 2014/0109113 | A1* | 4/2014 | Stacy | G09B 9/08 719/318 |
| 2014/0204799 | A1* | 7/2014 | Pietrowicz | H04L 41/12 370/254 |
| 2014/0280909 | A1* | 9/2014 | Gosink | G06Q 10/06 709/224 |
| 2015/0354964 | A1* | 12/2015 | Schneider | G05D 1/0088 701/533 |

OTHER PUBLICATIONS

YouTube video "ArcGIS 10 Query Layer—PostGIS, A first look" by Eric Randall, published Jun. 20, 2011, retrieved from https://www.youtube.com/watch?v=gsMEwdwH6Ts, partial transcript with screenshots attached, 4 pages.*

* cited by examiner

CYBER DOMAIN VISUALIZATION SYSTEMS AND METHODS

CROSS-REFERENCE TO RELATED APPLICATIONS

This application claims the benefit of U.S. Provisional Application No. 61/834,961, filed Jun. 14, 2013, the content of which is incorporated herein by reference in its entirety.

TECHNICAL FIELD

The present invention relates to computer systems, and, more particularly, to integrated cyberspace visualization systems and computer-based methods.

BACKGROUND

The ability to effectively monitor cyberspace is important to ensure mission success. Some existing systems may monitor the health and status of a network. However, there may be a need to import and integrate additional intelligence information (including, e.g., cyberspace intelligence) from disparate existing sources and present the information in a meaningful way.

SUMMARY

One embodiment is an application program window for a graphical user interface. The application program window includes a geospatial data view panel adapted to display a geospatial view based on one or more data sources selected for display. The geospatial view is updated in real-time based on updates received for the one or more data sources selected for display. The application window also includes a data source panel adapted to display a plurality of available data sources and, for one or more of the available data sources, one or more hyperlinks that, upon user selection, serve to update the geospatial view displayed by the geospatial data view panel based on the corresponding one or more of the available data sources. The application program window also includes a timeline panel adapted to display one or more controls that, upon user selection, serve to initiate playback of a timeline enabled geospatial view by the geospatial data view panel, the timeline enabled geospatial view comprising a sequence of views spanning a period of time.

There has thus been outlined, rather broadly, an embodiment of the invention in order that the detailed description thereof herein may be better understood, and in order that the present contribution to the art may be better appreciated. In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
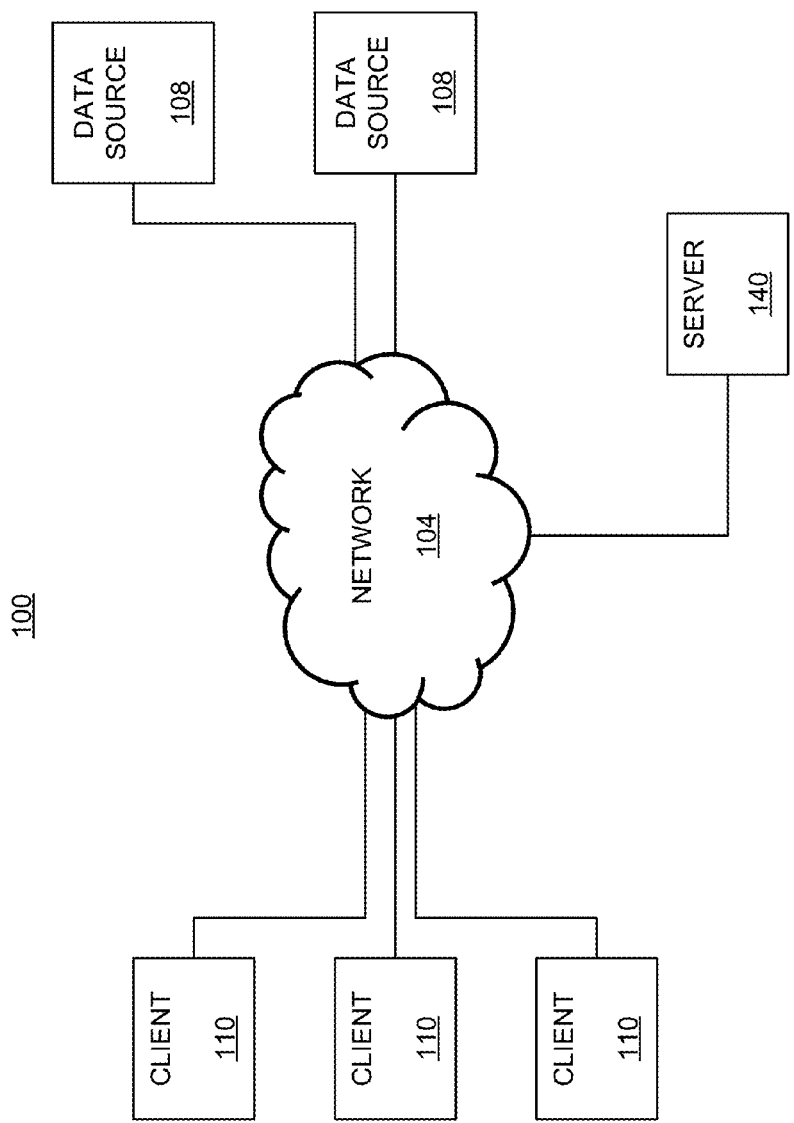
FIG. 1 is a diagram of a system for cyber domain visualization, in accordance with an embodiment of the present invention.

The invention will now be described with reference to the drawing figures, in which like reference numerals refer to like parts throughout. Embodiments of the present invention advantageously provide systems and computer-based methods for visualizing the cyber domain, as described in more detail below.

FIG. 1 is a diagram of a system 100 for visualizing cyber domain data, in accordance with an embodiment of the present invention. System 100 includes at least one server 140 coupled to a network 104, at least one client computer 110 coupled to the network 104, and at least one data source 108 coupled to the network 104. The client computer 110 may be any type of portable or non-portable personal computing device, such as, for example, a personal digital assistant (PDA), smart phone, tablet computer, laptop computer, notebook computer, desktop computer, etc., while the server 140 is a dedicated computer appropriately-configured to respond to requests from client computers 110 over the network 104, such as, for example, a personal computer, a server appliance, an enterprise server, a rack server, a tower server, a blade server, a minicomputer, etc. The data sources 108 may be any type of systems that provide data, such as, for example, computer systems that may be configured to provide data to server 140 and/or clients 110 (e.g., periodically, in batches, in real-time, and/or upon occurrence of a predetermined event such as a sensor or threshold alert) and computer systems from which server 140 and/or clients 110 can retrieve/pull data (e.g., periodically, in batches, in real-time and/or upon occurrence of a predetermined event such as a sensor or threshold alert).

The network 104 may couple the server 140 to the client computer 110 and the data source 108 using one or more network topologies, architectures and protocols, such as, for example, wired and/or wireless networks, local area networks (LANs), wide area networks (WANs), virtual private networks (VPNs), secured and/or unsecured networks, Ethernet, LocalTalk, Token Ring, FDDI, WiFi, TCP/IP, etc. Data encryption techniques may protect data flowing through the network 104, as well as data stored on servers 140 or client computers 110.

In the embodiment depicted in FIG. 1, the system 100 employs a client-server architecture, which advantageously employs network computing resources, such as the server 140, to manage the cyber domain visualization process, while the client computers 110 provide the user interface platform. Additionally, data to be visualized may be remotely acquired and communicated from one or more data sources 108, over network 104, to the server 140 for processing, analysis and incorporation into the cyber domain visualization process. Data may be stored in one or more local or network storage systems coupled to, or forming a part of, server 140. One or more of the data sources 108 can be coupled directly to the server 140. Additionally or alternatively, one or more of the data sources 108 can be integrated within the server 140.

In other embodiments, cyber domain data visualization, as well as data processing and analysis, may occur on a single computer coupled to the network 104, such as a single client computer 110. In alternative embodiments, cyber domain data visualization, as well as data processing and analysis, may occur in a peer-to-peer architecture using multiple computers coupled to the network 104, such as two or more client computers 110. Generally, server 140 and client computers 110 execute a combination of COTS operating system and application software, as well as one or more cyber domain data visualization software applications or modules, such as, for example, cyber domain manager module 152 and browser module 122, respectively, shown in FIGS. 2 and 3 and described below. Non-transitory computer-readable medium, such as, for example, non-volatile memory, optical disks, etc., may be used to store instructions for execution by the processors of server 140 and client computers 110. These instructions embody the various aspects of the present invention discussed below.

In some embodiments, system 100 can import and integrate, into a geospatial view, intelligence information (including, e.g., the geo-location of the intel and any files such as, for example, images, videos, and/or text associated with the intel) from disparate data sources 108 including, but not limited to the following data sources:

Social Media Networks (e.g. Facebook, Google+, Flickr, Pinterest);
RSS Feeds;
Websites (i.e. Anything in digital format could be considered a data source);
Online Forums;
Twitter;
Open APIs;
OData APIs;
3rd party indexers (e.g., Attivio and Babel Street);
CyberPartners VendorX, Recon, and Bonesaw;
Network Management/Monitoring Systems (e.g., Splunk, Solarwinds, WhatsUpGold, Sensor hardware, Interceptors, Seismographs, Phones with appropriate sensors/software, CCTV, IP Cameras, Raspberry devices, Arduino devices, etc.);
Integrated applications (e.g., a mission planning application, a network monitoring application, etc.); and
Map providers such as, for example, Bing maps, Google maps, Yahoo, Open Street Map, ArcGIS, WMS, TMS.

In some embodiments, system 100 can be integrated with mission planning software, such as, for example, Telos® SE7EN™: Mission Planner (embodiments of which are disclosed in U.S. patent application Ser. No. 14/154,950, which is hereby incorporated by reference in its entirety), and overlay additional information ingested from the data sources 108 to display a geospatial view of a planned mission vis-à-vis actual position location information being received (e.g., in real-time) pertinent to the mission and related complementing cyber information. This integrated geospatial view can provide the user with a contextual, functional, and mission-level understanding that links strategic, operational and tactical information for military plan execution, monitoring, and assessment.

In some embodiments, data sources 108 can include real-time situational awareness data from sources, such as, for example:

Commercial Aircraft (i.e., routes);
Marine Traffic (i.e., routes);
Traffic situation from Google, Bing, and/or other providers;
Information feeds from user defined sources like RSS, Local Government websites, Federal Websites/Feeds, Government APIs;
News feeds;
Telemetry feeds;
Stock market feeds;
Government feeds for critical infrastructure (e.g., Power grid);
Natural Disaster feeds (e.g., Tsunami, Earthquake, etc.);
Weather feeds (e.g., NOAA, Radar, etc.);
Crowd sourced information (e.g., Waze, mobile sensor networks);
Logistics companies;
Military SA Feeds (e.g., C2PC, COTXML, and BlueForce tracker); and
Emergency Response feeds (e.g., IPAWS, EDXL, and Computer Aided Dispatch systems).

System 100 can connect to map services such as Google Earth, Bing Maps, Yahoo, and Web Map Services (WMS) to allow users to interact with the geospatial data. Map data can be used in various formats, such as, for example, KML/KMZ, GeoJSON, DTED, GeoRSS, WMS, WFS, WMTS, TMS, Shape Files, GML, SFS, DeepZoom, Esri GeoDatabase, GPX, WKT, TopoJSON, 3D OSM, and GDAL. System 100 can allow users to enable map layers such as land borders, road labels, 3D terrain, and 3D buildings. System 100 can also allow users to select and/or filter data included in the geospatial view. System 100 can connect to map services using HyperText Transfer Protocol ("HTTP") and HyperText Transfer Protocol Secured ("HTTPS") protocols.

System 100 can utilize a security policy and user authentication to ensure that only authorized users can access the application. Users can log in to the application using either Windows Active directory or recognized application-specific login credentials. System 100 can utilize a role-based security policy, with two role types available: Administrator and User. In such embodiments, users with Administrator role can perform and access pages related to user and application security management tasks such as, for example, adding/removing a new user or modifying permissions of a user.

In embodiments, users can simultaneously connect to the server 140 via web browsers running on clients 110. Server 140 can connect with data sources 108, which in turn provide intel data and feeds from, for example, the cyber partners and events, third-party mapping services, and/or position location information ("PLI") services listed above. Client 140 can then display to the user a geospatial visualization of the data provided by the data sources 108. In some embodiments, clients 140 can receive data directly from one or more data sources 108 such as, for example, mapping data from a mapping data provider.

Figure 2:
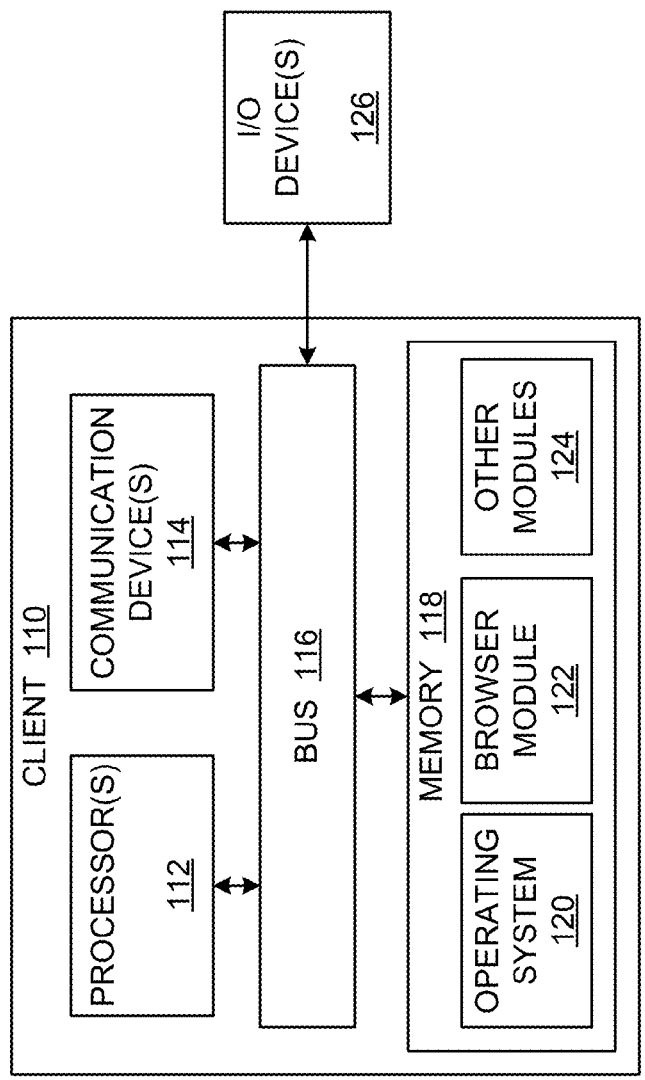
FIG. 2 is a diagram of a client system for cyber domain visualization, in accordance with an embodiment of the present invention.

FIG. 2 is a block diagram of client 110 in accordance with an embodiment of the present invention. Client 110 includes a bus 116 or other communication mechanism for communicating information, and a processor 112 coupled to bus 116 for processing information. Processor 112 may be any type of general or specific purpose processor. Client 110 further includes a memory 118 for storing information and instructions to be executed by processor 112. Memory 118 can be comprised of any combination of storage devices, such as, for example, random access memory ("RAM"), read only memory ("ROM"), static storage devices such as a magnetic or optical disk, or any other type of computer readable media. Client 110 further includes a communication device 114, such as a network interface card, to provide access to the network 104. Therefore, client 110 may interface with server 140 through network 104.

Computer readable media may be any available media that can be accessed by processor 112 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 112 is further coupled via bus 116 to an optional input/output device 126, such as a display (e.g., a Liquid Crystal Display ("LCD")), a keyboard, and/or a cursor control device (a computer mouse), to enable a user to interface with client 110.

In one embodiment, memory 118 stores software modules that provide functionality when executed by processor 112. The modules include an operating system 120 that provides operating system functionality for client 110. The modules further include a browser module 122 for connecting to server 140 to display a visualization of the cyber domain and/or mission, and other functionality disclosed herein. Client 110 can include one or more other modules 124. Client 110 may connect to server 140 via the communication device 114 through one or more intervening networks 104, such as, for example, a Local Area Network (LAN), a Wide Area Network (WAN), a wireless network (WiFi), the Internet, etc.

In some embodiments, browser module 122 displays a graphical user interface at client 110 that includes a geospatial view of data based on user selected mission plan and cyber domain data sources, as described below. Browser module 122 can connect to server 140 to provide a multiuser, multi-touch interface at the client 110 for hands-on view of the cyber domain.

Figure 3:
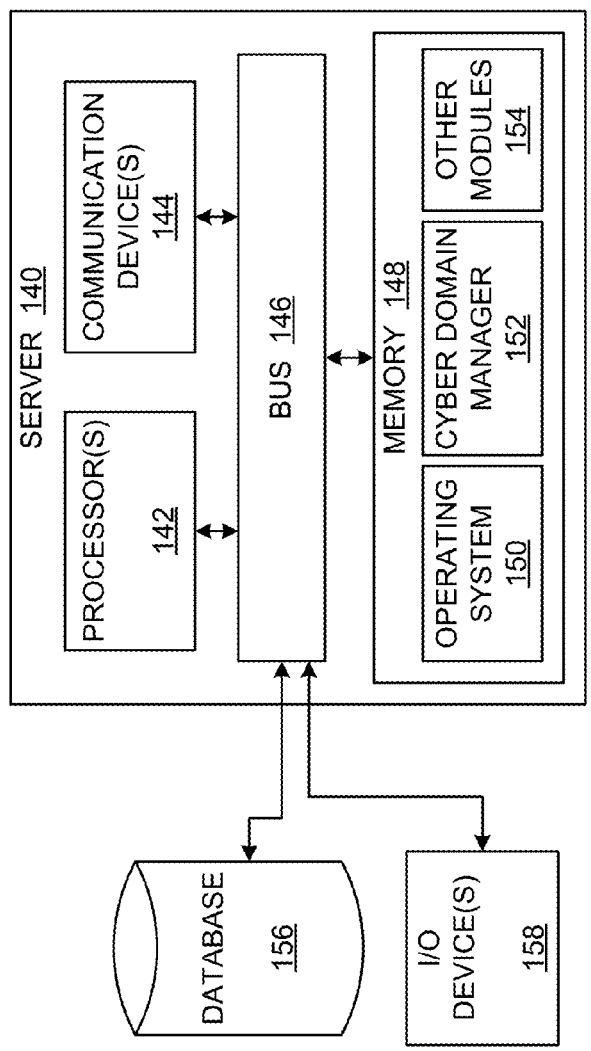
FIG. 3 is a diagram of a server system for cyber domain visualization, in accordance with an embodiment of the present invention.

FIG. 3 is a block diagram of server 140 in accordance with an embodiment of the present invention. Although shown as a single computer server/system, the functionality of server 140 can be implemented as a distributed system. Further, the functionality disclosed herein can be implemented on separate servers or devices that may be coupled together over a network. Further, one or more components of server 140 may not be included.

Server 140 includes a bus 146 or other communication mechanism for communicating information, and a processor 142 coupled to bus 146 for processing information. Processor 142 may be any type of general or specific purpose processor. Server 140 further includes a memory 148 for storing information and instructions to be executed by processor 142. Memory 148 can be comprised of any combination of storage devices, such as, for example, random access memory ("RAM"), read only memory ("ROM"), static storage devices such as a magnetic or optical disk, or any other type of computer readable media. Server 140 further includes a communication device 144, such as a network interface card, to provide access to the network 104. Therefore, a user may interface with server 140 directly, or remotely through a network, or any other method.

Computer readable media may be any available media that can be accessed by processor 142 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 142 is further coupled via bus 146 to an optional input/output device 158, such as a display (e.g., a Liquid Crystal Display ("LCD")), a keyboard, and/or a cursor control device (a computer mouse), to enable a user to interface with system 140.

In one embodiment, memory 148 stores software modules that provide functionality when executed by processor 142. The modules include an operating system 150 that provides operating system functionality for server 140. The modules further include a cyber domain manager module 152 for managing cyber domain and/or mission plan data, and other functionality disclosed herein. Cyber domain manager module 152 can include one or more modules, such as, for example, those described in FIG. 4 and described below. Server 140 can include one or more additional modules 154, such as, for example, Microsoft Internet Information Server (IIS) or other type of web server system. Alternatively, cyber domain manager module 152 may be included within functional module 154. Optionally, a database 156 can be coupled to bus 146 or communication device 144 to provide, inter alia, centralized storage for cyber domain manager module 152 and modules 154. System 140 can be part of a larger system, and one or more clients 110 may connect to the communication device 144 through one or more intervening networks 104, such as, for example, a Local Area Network (LAN), a Wide Area Network (WAN), a wireless network (WiFi), the Internet, etc.

Figure 4:
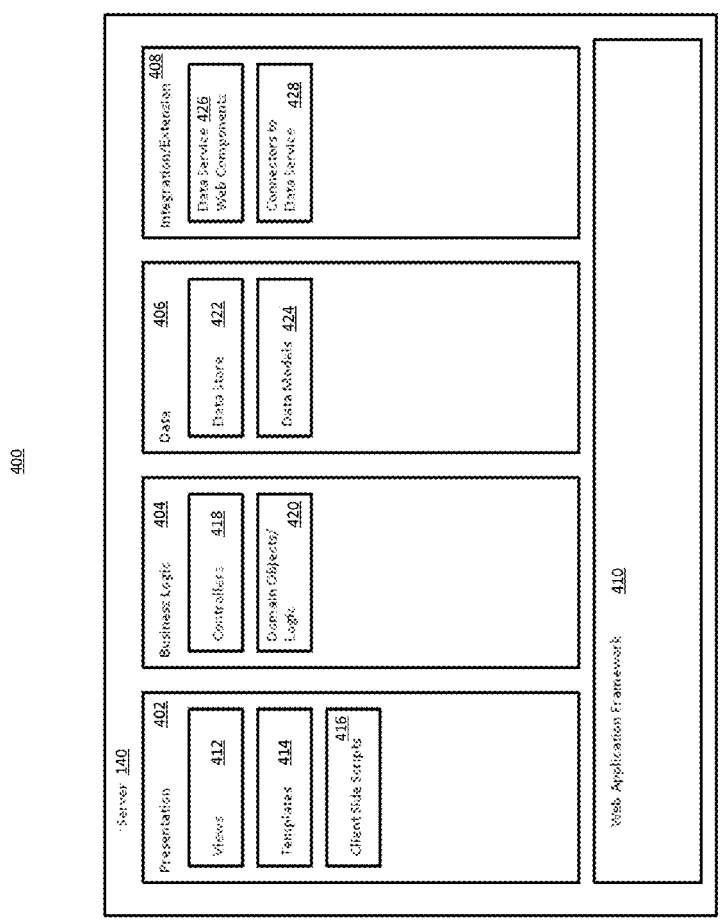
FIG. 4 is a diagram of a software module architecture, in accordance with an embodiment of the present invention.

FIG. 4 is a diagram of a software module architecture 400, in accordance with an embodiment of the present invention. In a preferred embodiment, Object Oriented Programming (OOP) techniques provide a foundation for software module architecture 400, which includes presentation module 402, business logic module 404, data module 406, integration/extension module 408, and web application framework module 410. Software module architecture 400 can be used for one or more software modules stored by memory 148 of server 140, such as, for example, the cyber domain manager module 152. Other software applications and/or modules may also be provided. Generally, a software application or module that uses OOP techniques employs classes, which may be arranged into one or more class libraries, to define data and associated procedures that represent complex data, concepts, real-world entities, etc. At runtime, the software application or module creates or instantiates objects from these classes, which interact to effectuate the purpose(s) for which the software application or module was written. The use of other programming techniques, such as, for example, imperative, functional, structured, etc., in combination with OOP techniques, is also contemplated by the present invention. Classes, class libraries, software applications and modules may be written using a variety of programming languages that support one or more of these programming techniques, such as C, C++, C#, Java, Visual Basic, MML/WPF, SQL, WCF, WPF, etc.

Presentation component 402 can be used for rendering of the user interface (UI) and contains views 412, templates 414, and client-side scripts 416. The business logic component 404 connects the presentation component 402 with the data component 406. The data component 406 takes care of retrieving and passing data between server 140; databases 156 and data sources 108; and clients 110. The integration/extension component 408 is comprised of a data service web component 426 and a data services connectors component 428. Integration/extension component 408 facilitates connection with data sources 108 such as, for example, third-party intel data sources and other data sources discussed herein. Web application framework component 410 can be used for loading scripts.

Clients 110 can communicate with the server 140 using the HyperText Transfer Protocol ("HTTP") and JavaScript Open Notation ("JSON") standards to receive/pull data to be displayed at the clients 110. The server 140 business logic layer 404 utilizes a Web API based on the HTTP/JSON standards to relay data to the clients 110. In some embodiments, server 140 can utilize Microsoft Active Server Pages (e.g., ASP MVC or ASP.NET MVC) for the presentation layer 402.

Figure 5:
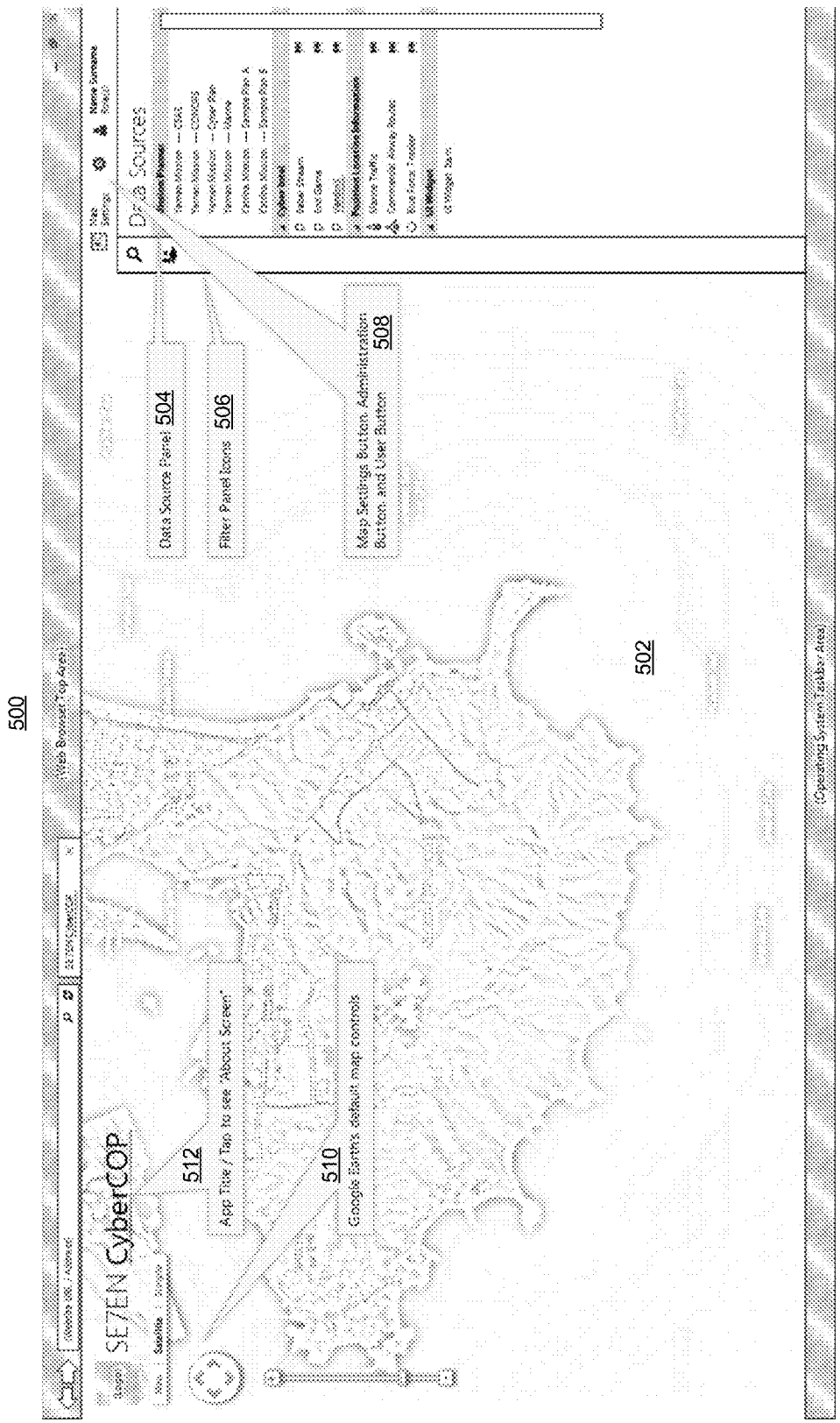
FIGS. 5-14 present a series of cyber domain visualization screens of a graphical user interface for browser module 122 and cyber domain manager module 152, in accordance with an embodiment of the present invention.

FIG. 5 presents a cyber domain data visualization screen 500 of a graphical user interface for browser module 122 and cyber domain manager module 152, in accordance with an embodiment of the present invention. The screen 500 can display mission data and other data selected by users (e.g., cyber domain and/or other cyber intel information), and appears after the user logs into a web application hosted by the server 140 from the client 110.

Cyber domain manager module 152 of server 140 can transmit to the client 110 data (e.g., HTML, CSS, JavaScript, etc.) configured to cause a web browser being executed at client 110 to render and display screen 500 and screens 600-1400 of FIGS. 6-14 (using, e.g., browser module 122). The data transmitted to the client 110 by the server 140 can be adapted to cause the client 110 to update display screens 500-1400 based on, for example, user selection of controls/links/widgets/buttons/etc. included in screens 500-1400. The screen 500 is displayed at the client 110 and includes a geospatial view panel 502, a data source panel 504, a filter panel 506, a management panel 508. The geospatial view panel 502 can include a title 512 and map controls 510.

Figure 13:
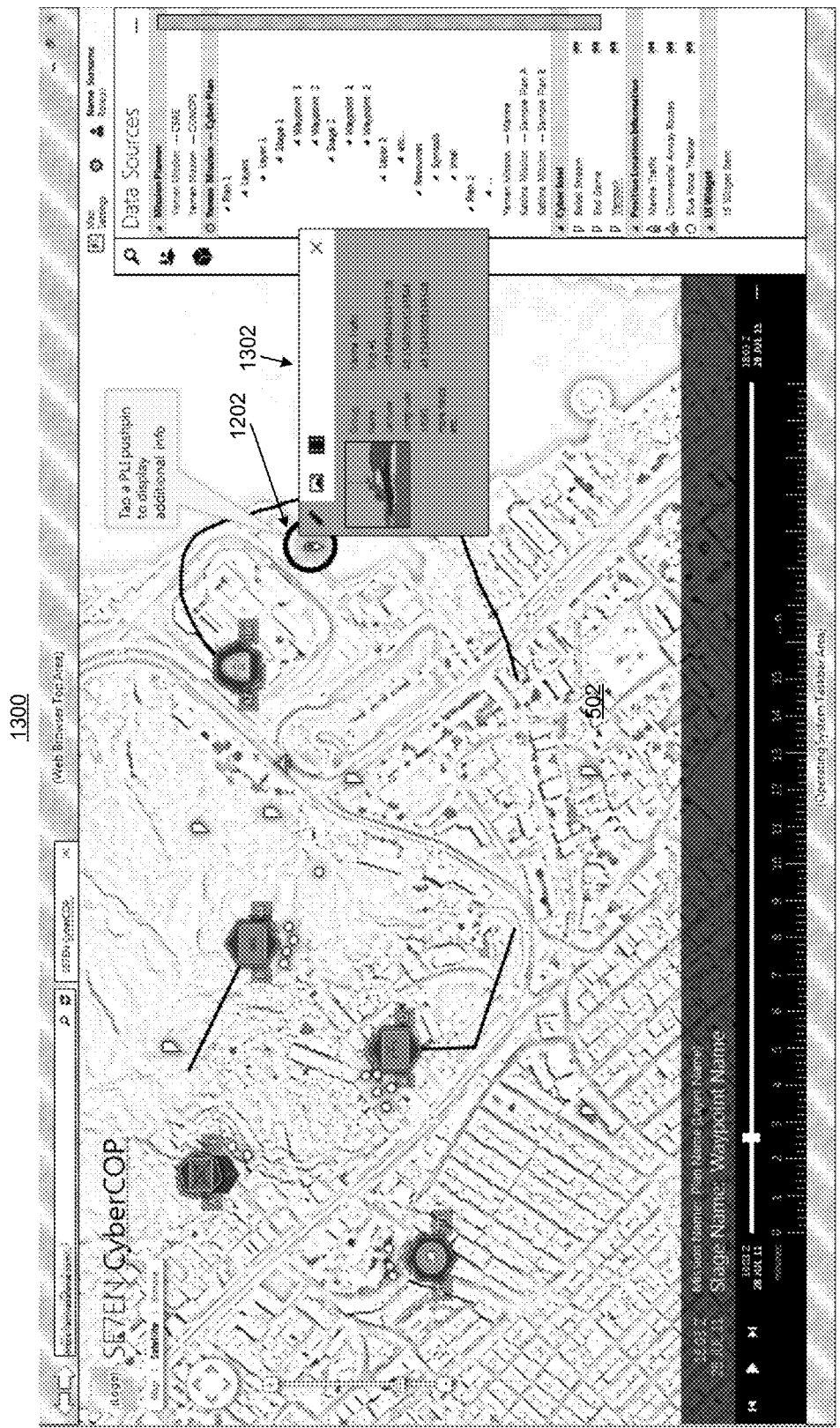

The filter panel 506 allows users to filter available data by entering search keywords and/or filtering by a user-defined geographic region (e.g., as shown in FIG. 13 and described below). Geospatial view panel 502 provides a geospatial view of selected missions and plans, PLI feeds, information from third-party open data sources (e.g., Babel Street), and other data feeds selected by the user. Management panel 508 allows users with an Administrator role to add, edit, and delete application users. Management panel 508 can also include a user account control that, upon user selection, allows the user to manage personal profile settings and preferences. Management panel 508 can also include a map settings control such as map settings button 702 shown in FIG. 7 and described below.

Figure 6:
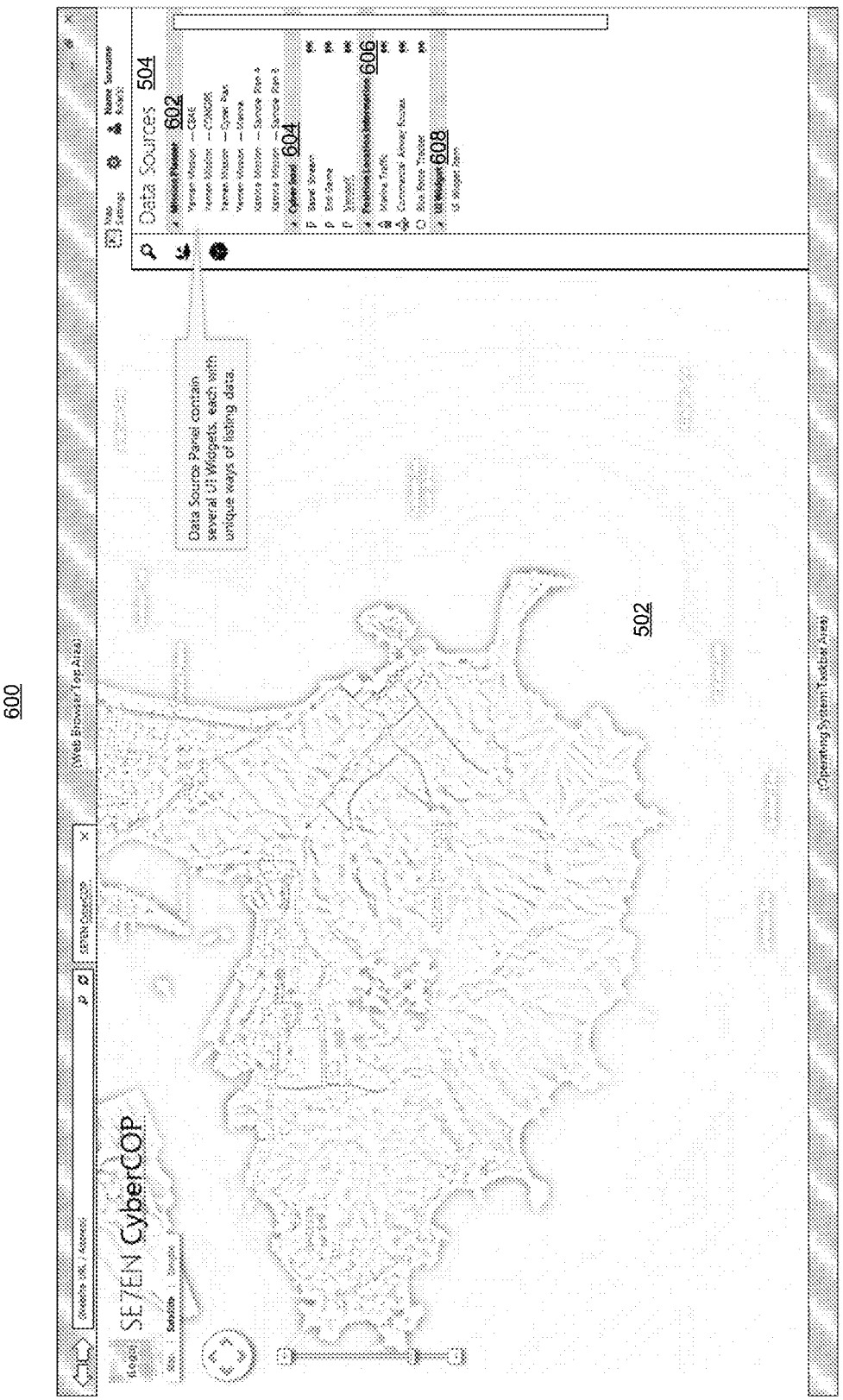

FIG. 6 presents a cyber domain data visualization screen 600 of a graphical user interface for browser module 122 and cyber domain manager module 152, in accordance with an embodiment of the present invention. Screen 600 includes data source panel 504 which can include user interface widgets for the available data sources. Data source panel 504 can include Mission Planner widget 602, Cyber Intel widget 604, Position Location Information widget 606, and generic IU widget 608. Data source panel 504 allows users to view all available data retrieved from a mission planner (e.g., Telos® SE7EN™: Mission Planner), PLI services, third-party Cyber Intel sources, etc. Upon user selection of one or more of widgets 602-608, the geospatial view panel 502 can be updated as shown, for example, in screen 800 of FIG. 8 and described below.

Figure 7:
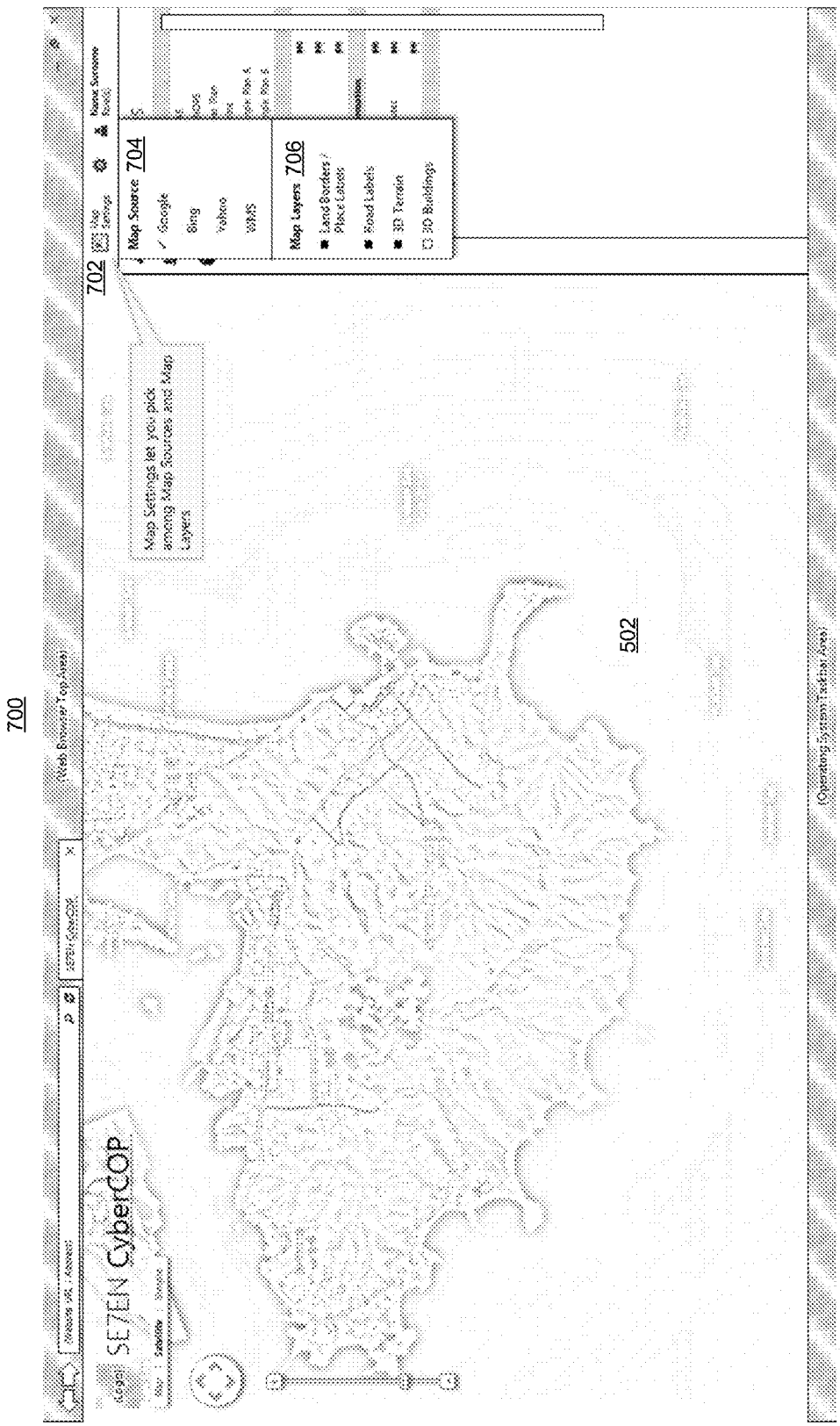

FIG. 7 presents a cyber domain data visualization screen 700 of a graphical user interface for browser module 122 and cyber domain manager module 152, in accordance with an embodiment of the present invention. Upon selection of a map settings button 702, screen 700 allows users to select a map source 704 (e.g., Google Earth, Bing Maps, Yahoo, and WMS servers) and map layers 706 such as, for example, 3D terrain and land borders. In some embodiments, client 110 transmits the user selection of map settings button 702 to server 140 which then responds with data configured to cause the client 110 to allow users to configure map settings (e.g., select a map source/layer). Additionally or alternatively, server 140 can transmit to client 110 data that is configured to, upon user selection of map settings button 702, cause client 110 to request/retrieve/pull (from server 140 or directly from a corresponding data source 108) mapping configuration data to display mapping configuration options to the user as shown in screen 700.

Figure 8:
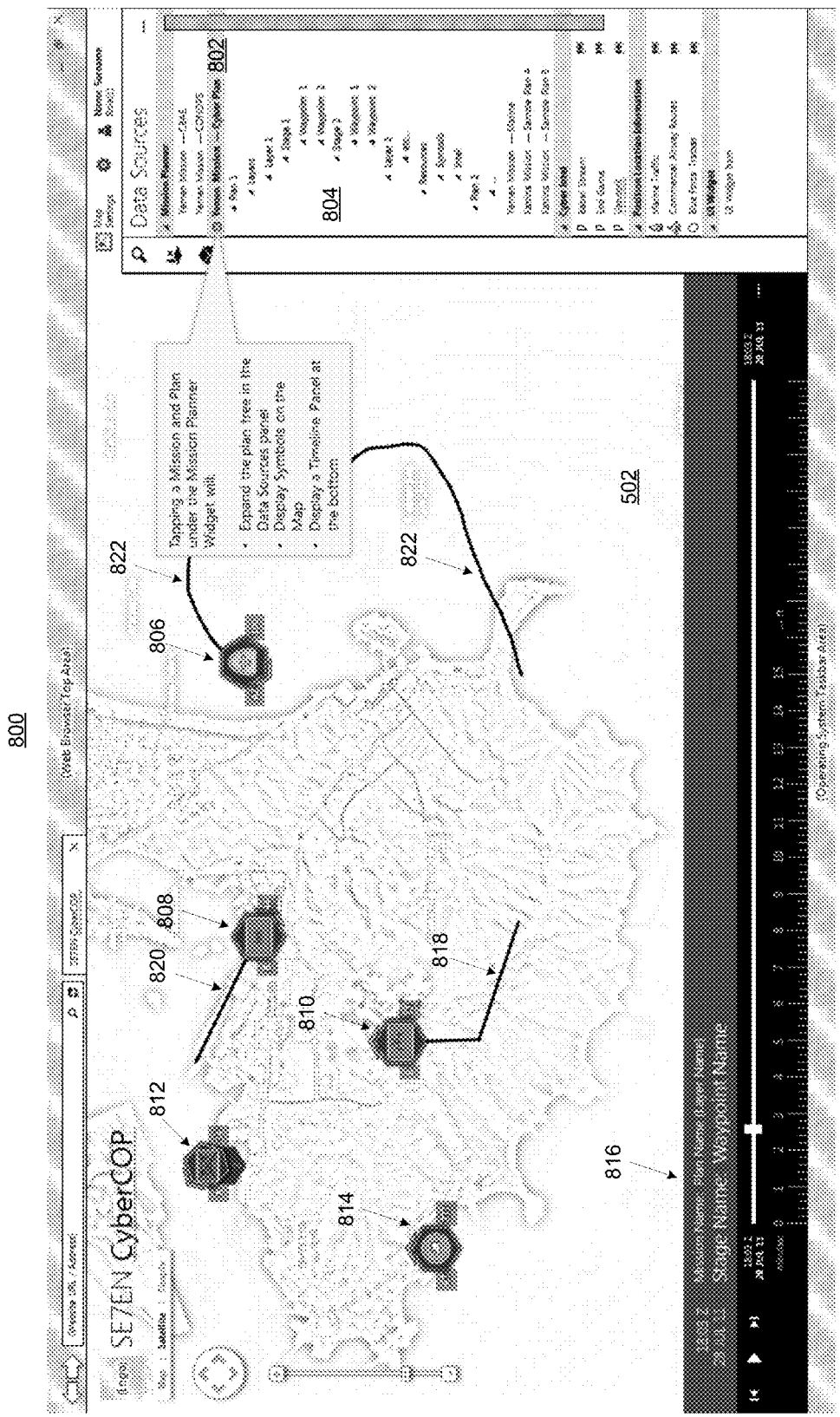

FIG. 8 presents a cyber domain data visualization screen 800 of a graphical user interface for browser module 122 and cyber domain manager module 152, in accordance with an embodiment of the present invention. Upon user selection of mission 802 listed in the mission planner section 602 of the data source panel 504, the data source panel 504 is updated to display an expanded tree view 804 of mission 802, the geospatial view panel 502 is updated to display symbols 806-814 associated with selected mission 802, and a timeline panel 816 is displayed. Movement of elements represented by symbols 806-814 over time during the mission can be shown by lines 818-822. In some embodiments, client 110 transmits the user selection of mission 802 to server 140 which then responds with data configured to cause the client 110 to update the data source panel 504 to display the expanded tree view 804 of mission 802 and update the geospatial view panel 502 to display symbols 806-814 associated with selected mission 802. Additionally or alternatively, server 140 can transmit to client 110 data that is configured to, upon user selection of mission 802, cause client 110 to request/retrieve/pull (from server 140 or directly from a corresponding data source 108) data corresponding to mission 802 for updating the data source panel 504 and geospatial view panel 502 as described above.

Figure 9:
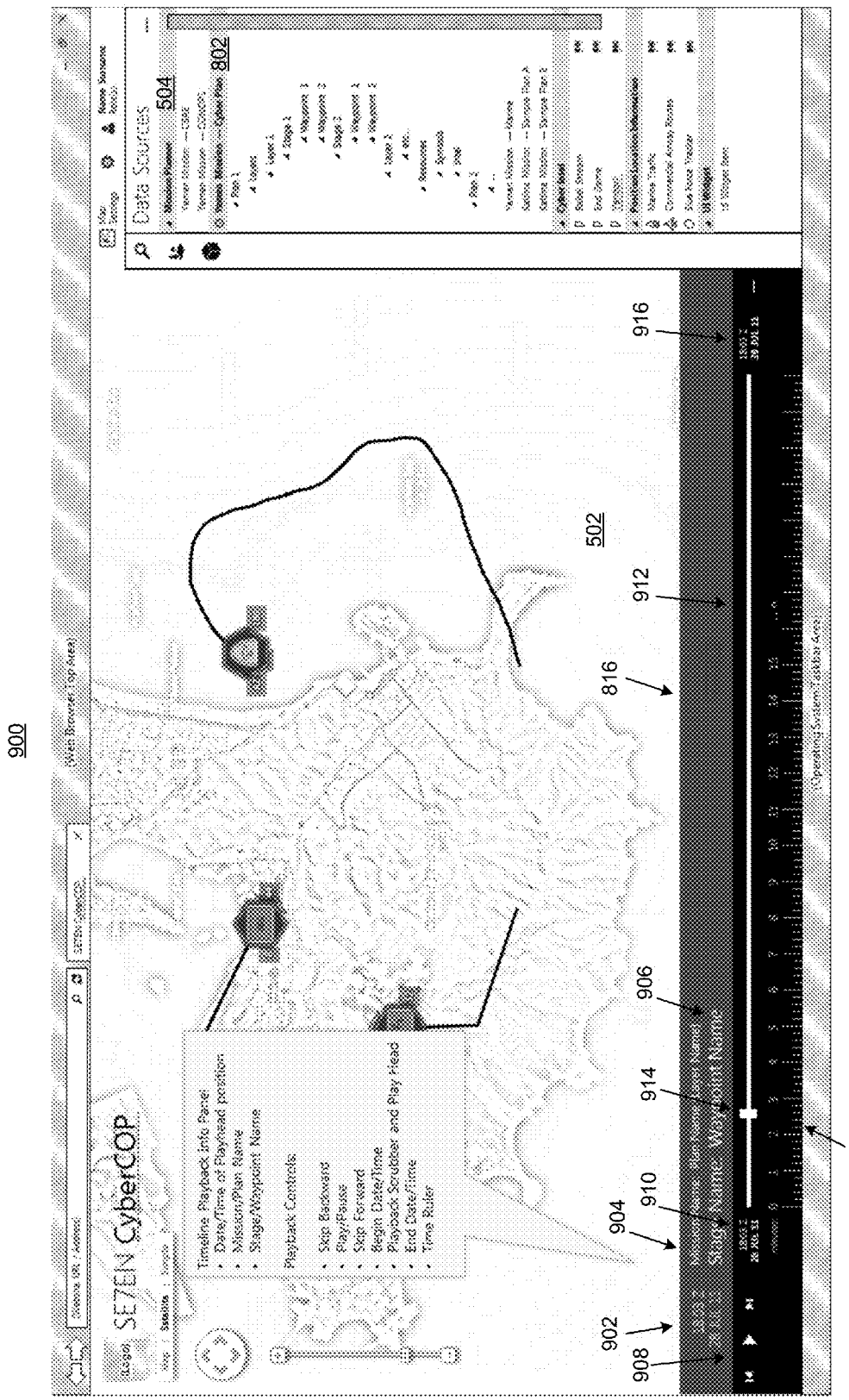

FIG. 9 presents a cyber domain data visualization screen 900 of a graphical user interface for browser module 122 and cyber domain manager module 152, in accordance with an embodiment of the present invention. Upon user selection of mission 802, the timeline panel 816 can be displayed allowing the user to playback the selected mission 802. The timeline panel 816 can include the date and time of the current playhead position 902, the selected mission/plan name 904, the stage/waypoint name 906, and playback controls 908 (including, for example, skip backward, play/pause, skip forward), begin date/time 910, playback scrubber 912 and play head 914, end date/time 916, and time ruler 918. Timeline panel 816 allows the user to playback the selected mission(s) at a specific point and/or pause real-time playback for playback at a later time. Playback upon user selection of mission 802 can include displaying planned mission data for mission 802 vis-à-vis actual position information and/or cyber intel data pertinent to mission 802. In some embodiments, the actual position information and/or cyber intel data is received and displayed in real-time and can be received by the client 110 from the server 140.

Additionally or alternatively, the actual position information and/or cyber intel data can be received from the data sources 108 directly. In some embodiments, the timeline panel 816 is hideable and can be hidden from view.

Figure 10:
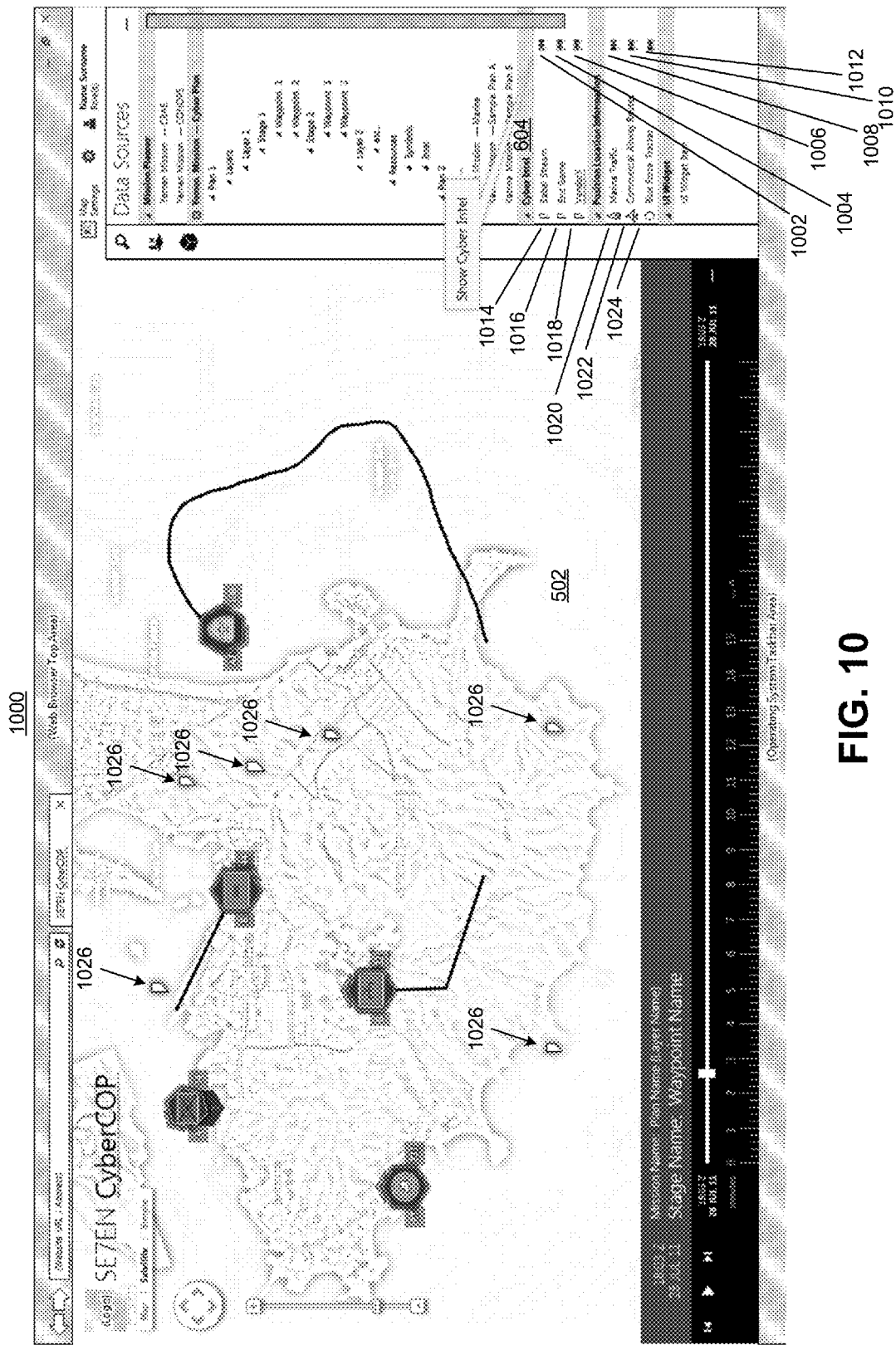

FIG. 10 presents a cyber domain data visualization screen 1000 of a graphical user interface for browser module 122 and cyber domain manager module 152, in accordance with an embodiment of the present invention. Screen 1000 includes visibility icons 1002-1012 corresponding to cyber intel data sources 1014-1018 and position location information sources 1020-1024, respectively. Upon user selection of visibility icon 1002, the system displays the corresponding Babel Street data 1014 in the geospatial view panel 502 in the form of cyber intel pushpins 1026. In some embodiments, client 110 transmits the user selection of visibility icon 1002 to server 140 which then responds with data configured to cause the client 110 to display the cyber intel pushpins 1026. Additionally or alternatively, server 140 can transmit to client 110 data that is configured to cause client 110 to request/retrieve/pull the data corresponding to cyber intel pushpins 1026 upon user selection of visibility icon 1002 (from server 140 or directly from a corresponding data source 108).

Figure 11:
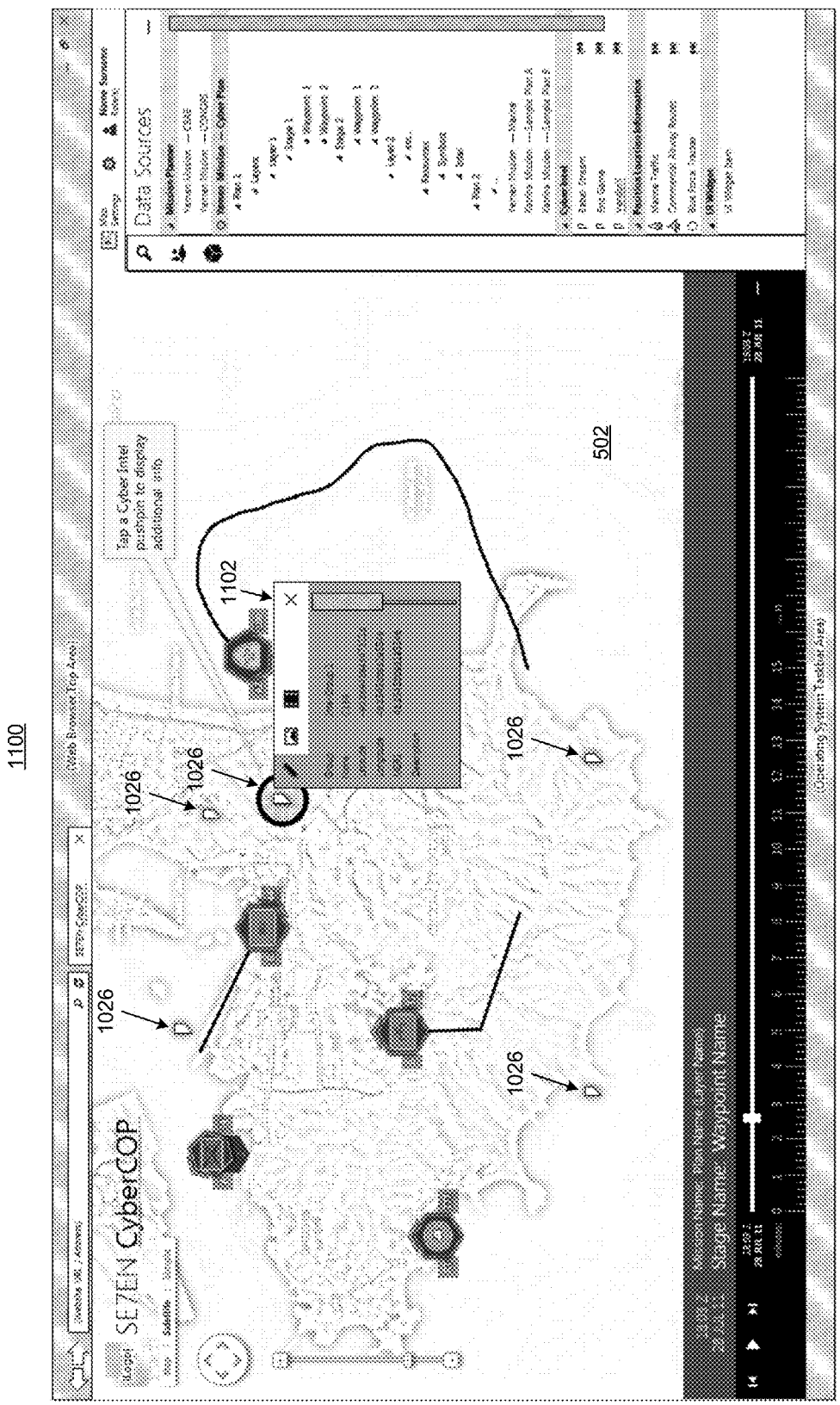

FIG. 11 presents a cyber domain data visualization screen 1100 of a graphical user interface for browser module 122 and cyber domain manager module 152, in accordance with an embodiment of the present invention. Upon user selection of a cyber intel pushpin 1026, the system displays a context menu 1102 that includes details on the specific Cyber Intel data corresponding to the selected pushpin. Context menu 1102 displays the name of the group that the Cyber Intel data belongs to, geolocation information, etc. Context menu 1102 allows users to view images and videos associated to the corresponding Cyber Intel data. In some embodiments, client 110 transmits the user selection of a cyber intel pushpin 1026 to server 140 which then responds with data configured to cause the client 110 to display the context menu 1102. Additionally or alternatively, server 140 can transmit to client 110 data that is configured to cause client 110 to request/retrieve/pull the data for context menu 1140 upon user selection of a cyber intel pushpin 1026 (from server 140 or directly from a corresponding data source 108).

Figure 12:
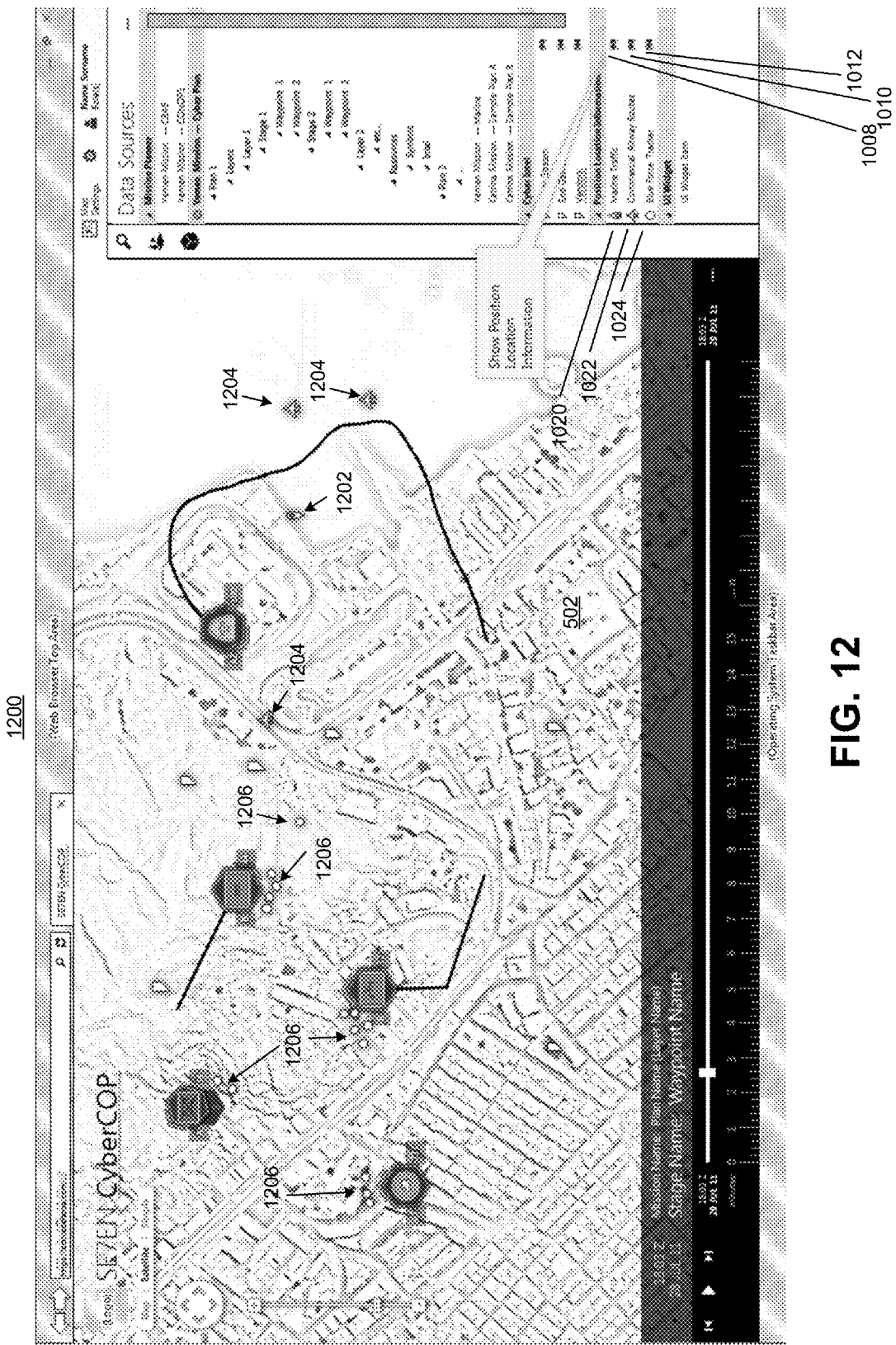

FIG. 12 presents a cyber domain data visualization screen 1200 of a graphical user interface for browser module 122 and cyber domain manager module 152, in accordance with an embodiment of the present invention. Upon user selection of visibility icons 1008, 1010, and 1012, the system displays the corresponding Marine Traffic data 1020, Commercial Airway Routes data 1022, and Blue Force Tracker data 1024 in the geospatial view panel 502 in the form of position location pushpins 1202, 1204, and 1206, respectively. In some embodiments, client 110 transmits the user selection of visibility icons 1008, 1010, and 1012 to server 140 which then responds with data configured to cause the client 110 to display the position location pushpins 1202, 1204, and 1206. Additionally or alternatively, server 140 can transmit to client 110 data that is configured to cause client 110 to request/retrieve/pull the data corresponding to position location pushpins 1202, 1204, and 1206 upon user selection of visibility icons 1008, 1010, and 1012 (from server 140 or directly from a corresponding data source 108).

FIG. 13 presents a cyber domain data visualization screen 1300 of a graphical user interface for browser module 122 and cyber domain manager module 152, in accordance with an embodiment of the present invention. Upon user selection of position location pushpin 1116, the system displays a context menu 1302 that includes details on the specific PLI data corresponding to the selected pushpin. Context menu 1302 displays the name of the group that the PLI data belongs to, geolocation information, etc. Context menu 1302 allows users to view images, audio, videos, and or other electronic files associated to the corresponding PLI data. In some embodiments, client 110 transmits the user selection of a position location pushpin 1116 to server 140 which then responds with data configured to cause the client 110 to display the context menu 1302. Additionally or alternatively, server 140 can transmit to client 110 data that is configured to cause client 110 to request/retrieve/pull the data for context menu 3140 upon user selection of a position location pushpin 1116 (from server 140 or directly from a corresponding data source 108).

Context menus 1102 and 1302 can provide users with images in any of the following formats: Jpeg, GIF, PNG, TIFF, and BMP; videos in any of the following formats: MP4, AVI, WEBM, and OGV; and/or audio in any of the following formats: MP3, OGG, and WAV.

In some embodiments, although not shown, any of screens 500-1400 can include a component or control that allows the user to take an action based on the data being displayed and/or selected for display in the geospatial view panel. In some such embodiments, any of screens 500-1400 can include a link to another system separate from server 140 and/or integrated within server 140 that, when selected by the user, causes the client 110 to connect to the other system (using, for example, single sign-on ("SSO") access controls). For example, contextual menus 1102 and/or 1302 can include links to other systems that allow the user to take an action based on the data displayed in the corresponding contextual menu. In some examples, the actions can include applying patches to vulnerable systems, investigating physical intrusions, etc. In some examples, the action taken can include engaging in collaboration with other users or others in general. For example, although not shown, a collaboration component can be integrated within client 110, server 140, and/or provided as a separate system that permits collaboration between users and/or collaboration between users and others. The collaboration component can include various modules such as, for example, one or more modules using the XMPP standard (e.g., chat, voice, and video) and/or a custom implementation of a collaboration interface (e.g., chat, file sharing, video, voice, and telestration), and can include support for military standards (such as military standards for COTXML, chat, file sharing, and/or video).

Figure 14:
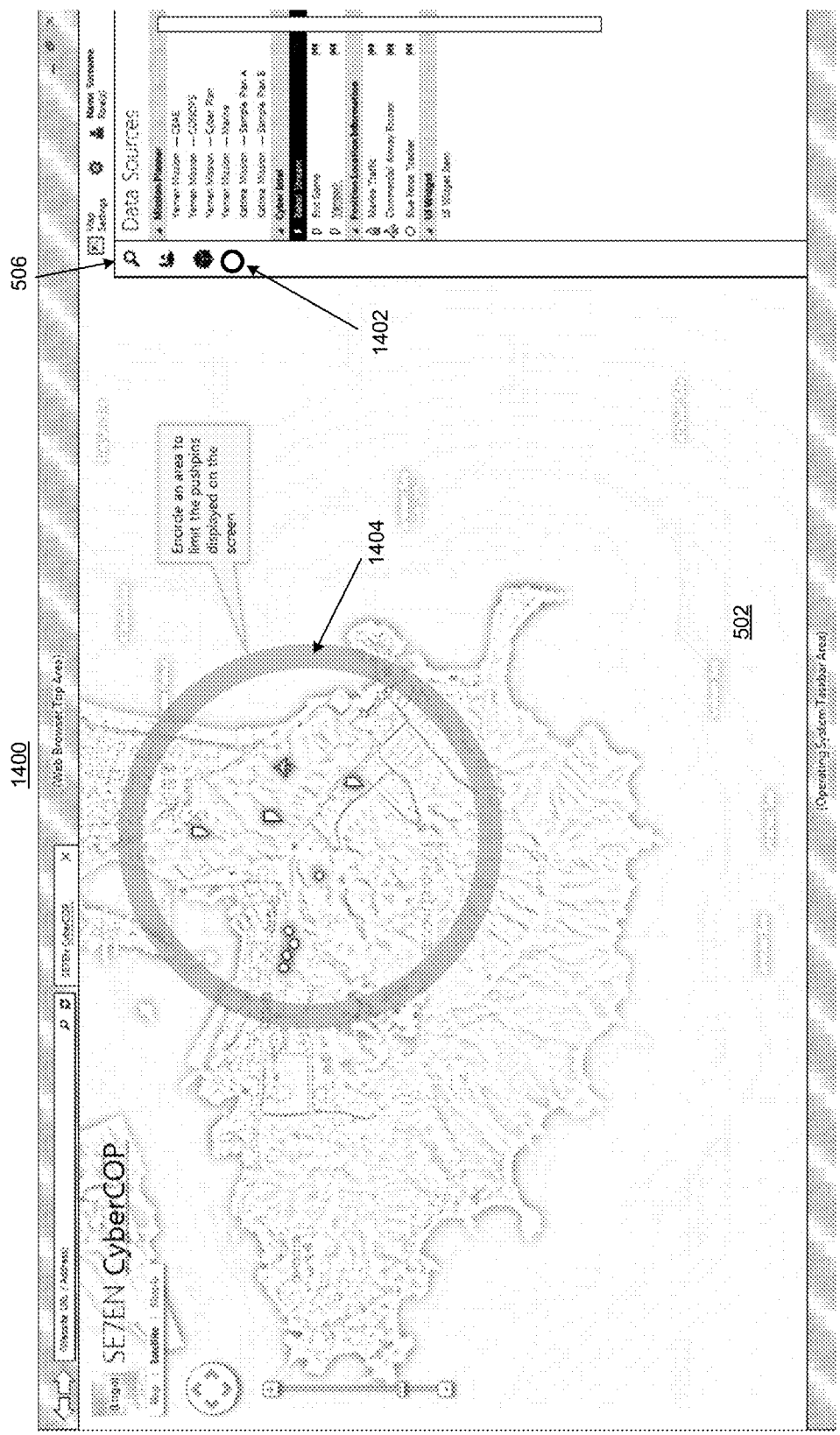

FIG. 14 presents a cyber domain data visualization screen 1400 of a graphical user interface for browser module 122 and cyber domain manager module 152, in accordance with an embodiment of the present invention. Filter panel 506 can include a geospatial filter icon 1402 that, upon user selection, allows the user to specify a geographic area 1404 in the geospatial view panel 502 to filter data shown in the geospatial view panel 502 to data within the geographic area 1404. For example, upon user selection of geospatial filter icon 1402, the user can define the geographic area 1404 as a circle by entering a radius value (e.g., in miles) and specifying a center location from which the radius extends creating the circular geographic area 1404. Alternatively or additionally, the user can define the geographic area by selecting three or more points in the geospatial view panel 502 that are then connected to define the geographic area.

According to first embodiments, an application program window to be presented on a display device for a graphical user interface produced by an application program operating on a processor having the display device associated therewith is disclosed. In first embodiments, the application program window can include a geospatial data view panel, a data source panel, and a timeline panel. In first embodiments, the geospatial data view panel can be adapted to display a geospatial view based on one or more data sources selected for display, the geospatial view being updated in real-time based on updates received for the one or more data sources selected for display. In first embodiments, the data source panel can be adapted to display a plurality of available data sources and, for one or more of the available data sources, one or more hyperlinks that, upon user selection, serve to update the geospatial view displayed by the geospatial data view panel based on the corresponding one or more of the available data sources. In first embodiments, the timeline panel can be adapted to display one or more controls that, upon user selection, serve to initiate playback of a timeline enabled geospatial view by the geospatial data view panel, the timeline enabled geospatial view comprising a sequence of views spanning a period of time.

Any of the foregoing first embodiments can be varied to form additional first embodiments in which the application program window can include a filter panel including a string search control that, upon user selection, serves to filter data displayed in the geospatial data view panel based on a user entered string, and a geographic search control that, upon user selection, serves to draw, based upon user input, a geometric shape overlaid on the geospatial data view panel to filter data displayed in the geospatial data view panel to exclude data outside of the geometric shape.

Any of the foregoing first embodiments can be varied to form additional first embodiments in which the application program window includes a map settings control that, upon user selection, serves to display one or more map source controls and one or more map layer controls, that upon user selection, serve to update the geospatial view displayed by the geospatial data view panel, an administration control that, upon user selection, serves to display user controls that, upon user selection, set user access permissions based on user input, and a user account control that, upon user selection, allows the user to manage personal profile settings and preferences.

Any of the foregoing first embodiments can be varied to form additional first embodiments in which the plurality of available data sources includes a mission planer, the mission planner comprising one or more mission plans, and each mission plan is selectable and upon user selection is included in the geospatial view displayed by the geospatial data view panel.

Any of the foregoing first embodiments can be varied to form additional first embodiments in which, when one or more mission plans is selected to be included in the geospatial view, the geospatial view is a timeline enabled geospatial view.

Any of the foregoing first embodiments can be varied to form additional first embodiments in which each of the plurality of available data sources is displayed using a widget, which, when selected, displays a list of available data associated with the corresponding data source.

Any of the foregoing first embodiments can be varied to form additional first embodiments in which, upon user selection of a selected mission plan of the one or more mission plans, the data source panel displays an expanded plan tree for the selected mission plan, the geospatial data view panel displays one or more symbols, and the timeline panel is displayed.

Any of the foregoing first embodiments can be varied to form additional first embodiments in which the viewable timeline panel displays, when the geospatial data view panel is a timeline enabled geospatial view, information including date and time of playback position, mission or plan name, and stage or waypoint name.

Any of the foregoing first embodiments can be varied to form additional first embodiments in which the geospatial data view panel overlays one or more widgets on the geospatial view of one or more data sources selected for display.

Any of the foregoing first embodiments can be varied to form additional first embodiments in which the hyperlink is one of a selectable text string, a button, and an image.

Any of the foregoing first embodiments can be varied to form additional first embodiments in which the plurality of available data sources includes a cyber intel data source, and, upon user selection of the cyber intel data source, the geospatial data view panel displays a cyber intel pushpin that, upon user selection, serves to cause the geospatial data view panel to display additional information associated with the cyber intel pushpin.

Any of the foregoing first embodiments can be varied to form additional first embodiments in which the plurality of available data sources includes a position location data source, and, upon user selection of the position location data source, the geospatial data view panel displays a position location pushpin that, upon user selection, serves to cause the geospatial data view panel to display additional information associated with the position location pushpin.

According to second embodiments, a system for providing a real-time consolidated geospatial view of data from various data sources is disclosed. In second embodiments, the system can include a server computer, coupled to a network, including a processor coupled to a memory storing instructions that, when executed by the processor, perform a method for providing a consolidated real-time view of various data sources. In second embodiments, the method can include transmitting first data to a client computer coupled to the network, the first data being adapted to cause the client to display a graphical user interface (GUI) at a display coupled to the client, the GUI comprising a geospatial data view panel, a data source panel, and a timeline panel. In second embodiments, the method can include the data source panel being adapted to display a plurality of available data sources and, for one or more of the available data sources, one or more hyperlinks that, upon user selection of one of the one or more data sources, transmit the selected data source to the server. In second embodiments, the method can include receiving from the client a selected data source. In second embodiments, the method can include transmitting, in response to receiving the selected data source, second data to the client, the second data being adapted to cause the geospatial data view panel to display a geospatial view based on the selected data source. In second embodiments, the method can include transmitting, in substantially real-time, update data to the client based on updates received for the selected data source. In second embodiments, the timeline panel can be adapted to display one or more controls that, upon user selection, serve to initiate playback of a timeline enabled geospatial view in the geospatial data view panel, the timeline enabled geospatial view comprising a sequence of views spanning a period of time.

Any of the foregoing second embodiments can be varied to form additional second embodiments in which the GUI includes a filter panel that includes a string search control that, upon user selection, serves to filter data displayed in the geospatial data view panel based on a user entered string, and a geographic search control that, upon user selection, serves to draw, based upon user input, a geometric shape overlaid on the geospatial data view panel to filter data displayed in the geospatial data view panel to exclude data outside of the geometric shape.

Any of the foregoing second embodiments can be varied to form additional second embodiments in which the plurality of available data sources includes a mission planer, the mission planner comprising one or more mission plans, and the one or more hyperlinks includes a hyperlink for one of the mission plans.

Any of the foregoing second embodiments can be varied to form additional second embodiments in which the hyperlink is one of a selectable text string, a button, and an image.

Any of the foregoing second embodiments can be varied to form additional second embodiments in which the method further includes receiving, from the client, a request selecting a data source, and transmitting third data to the client, the third data being adapted to cause the geospatial data view panel to display a pushpin corresponding to data provided by the selected data source that, upon user selection, serves to display additional information associated with the pushpin.

According to third embodiments, a non-transitory computer-readable medium including instructions stored thereon, the instructions, when executed by a processor, perform a method for presenting various data sources in a geospatial view is disclosed. In third embodiments, the method can include displaying a graphical user interface (GUI) at a display coupled to the processor, the GUI comprising a geospatial data view panel, a data source panel, and a timeline panel. In third embodiments, the method can include displaying, at the data source panel, a plurality of available data sources and, for one or more of the available data sources, one or more hyperlinks. In third embodiments, the method can include transmitting, upon user selection of one of the one or more hyperlinks, a request to a server indicating a first selected data source corresponding to the selected hyperlink, the server being coupled to a network coupled to the processor. In third embodiments, the method can include receiving first data from the server. In third embodiments, the method can include displaying, at the geospatial data view panel, a geospatial view based on the received first data. In third embodiments, the method can include receiving updated first data in substantially real-time from the server. In third embodiments, the method can include updating the geospatial view in substantially real-time based on the updated first data received from the server. In third embodiments, the method can include displaying, at the timeline panel, one or more controls that, upon user selection, serve to initiate playback of a timeline enabled geospatial view at the geospatial data view panel, the timeline enabled geospatial view comprising a sequence of views spanning a period of time.

Any of the foregoing third embodiments can be varied to form additional third embodiments in which the method includes transmitting, upon user selection of one of the one or more hyperlinks, a request to the server indicating a second selected data source corresponding to the selected hyperlink, receiving second data from the server, and displaying, at the geospatial data view panel, a consolidated geospatial view of the first and second selected data sources based on the received first and second data.

Any of the foregoing third embodiments can be varied to form additional third embodiments in which the GUI includes a filter panel that includes a string search control that, upon user selection, serves filter data displayed in the geospatial data view panel based on a user entered string, and a geographic search control that, upon user selection, serves to draw, based upon user input, a geometric shape overlaid on the geospatial data view panel to filter data displayed in the geospatial data view panel to exclude data outside of the geometric shape.

Any of the foregoing third embodiments can be varied to form additional third embodiments in which the plurality of available data sources includes a mission planer, the mission planner comprising one or more mission plans.

Any of the foregoing third embodiments can be varied to form additional third embodiments in which the hyperlink is one of a selectable text string, a button, and an image.

Any of the foregoing third embodiments can be varied to form additional third embodiments in which the method includes transmitting, to the server, a request selecting a data source, receiving pushpin data from the server, and displaying, at the geospatial data view panel, a pushpin based on the received pushpin data that, upon user selection, serves to display additional information associated with the pushpin.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method performed by an application program operating on a processor having a display device associated therewith, the method comprising:

displaying, on the display device, an application program window comprising:
  a geospatial data view panel adapted to display a geospatial view based on one or more data sources selected for display, the geospatial view being updated in realtime based on updates received for the one or more data sources selected for display;
  a data source panel displaying at least three of a plurality of available data sources including a position location data source, a cyber intel source, and a mission planner having one or more selectable mission plans, and, for one or more of the available data sources, one or more hyperlinks that, upon user selection, serve to update the geospatial view displayed by the geospatial data view panel based on the corresponding one or more of the available data sources;
  a timeline panel adapted to display one or more controls that, upon user selection, serve to initiate playback of a timeline enabled geospatial view by the geospatial data view panel, the timeline enabled geospatial view comprising a sequence of views spanning a period of time; and
  a toolbar comprising:
    a map settings control that, upon user selection, serves to display one or more map source controls and one or more map layer controls, that upon user selection, serve to update the geospatial view displayed by the geospatial data view panel,
    an administration control that, upon user selection, serves to display user controls that, upon user selection, set user access permissions based on user input, and a user account control that, upon user selection, allows the user to manage personal profile settings and preferences;

in response to receiving a user selection of one of the data sources:
  transmitting a request to a server indicating a first selected data source corresponding to the selected data source,
  receiving first data from the server, and
  displaying, in the geospatial data view panel, a geospatial view based on the received first data;

in response to receiving a user selection of another one of the data sources:
  transmitting a request to the server indicating a second selected data source corresponding to the selected another one of the data sources,
  receiving second data from the server, and
  displaying, in the geospatial data view panel, a consolidated geospatial view of the first and second selected data sources based on the received first and second data;

in response to receiving a user selection of a mission plan:
  updating the displayed data source panel to display an expanded plan tree for the selected mission plan,
  updating the displayed geospatial data view panel to display one or more symbols associated with the selected mission plan, and displaying the timeline panel; and in response to receiving a user selection of the position location data source:
  displaying, in the geospatial data view panel, a position location pushpin, and, in response to user selection of the position location pushpin, displaying additional information associated with the position location pushpin.

2. The method as recited in claim 1, wherein the application program window further comprises a filter panel comprising:
  a string search control that, upon user selection, serves to filter data displayed in the geospatial data view panel based on a user entered string; and
  a geographic search control that, upon user selection, serves to draw, based upon user input, a geometric shape overlaid on the geospatial data view panel to filter data displayed in the geospatial data view panel to exclude data outside of the geometric shape.

3. The method as recited in claim 1, wherein, when one or more mission plans is selected to be included in the geospatial view, the geospatial view is a timeline enabled geospatial view.

4. The method as recited in claim 1, wherein each of the plurality of available data sources is displayed using a widget, which, when selected, displays a list of available data associated with the corresponding data source.

5. The method as recited in claim 1, wherein the viewable timeline panel displays, when the geospatial data view panel is a timeline enabled geospatial view, information including date and time of playback position, mission or plan name, and stage or waypoint name.

6. The method as recited in claim 1, wherein the geospatial data view panel overlays one or more widgets on the geospatial view of one or more data sources selected for display.

7. The method as recited in claim 1, wherein the hyperlink is one of a selectable text string, a button, and an image.

8. The method as recited in claim 1, wherein the plurality of available data sources comprises a cyber intel data source, and wherein, upon user selection of the cyber intel data source, the geospatial data view panel displays a cyber intel pushpin that, upon user selection, serves to cause the geospatial data view panel to display additional information associated with the cyber intel pushpin.

9. A system for providing a real-time consolidated geospatial view of data from various data sources, comprising a server computer, coupled to a network, including a processor coupled to a memory storing instructions that, when executed by the processor, perform a method for providing a consolidated real-time view of various data sources, the method comprising:

transmitting first data to a client computer coupled to the network, the first data being adapted to cause the client to display a graphical user interface (GUI) at a display coupled to the client, the GUI comprising a geospatial data view panel, a data source panel, a timeline panel, and a toolbar comprising a map settings control that, upon user selection, displays one or more map source controls and one or more map layer controls, that upon user selection, updates the geospatial view displayed by the geospatial data view panel, an administration control that, upon user selection, displays user controls that, upon user selection, sets user access permissions based on user input, and a user account control that, upon user selection, allows the user to manage personal profile settings and preferences;

the data source panel displaying at least three of a plurality of available data sources including a position location data source, a cyber intel source and a mission planner having one or more selectable mission plans, and, for one or more of the available data sources, one or more hyperlinks that, upon user selection of one of the one or more data sources, transmit the selected data source to the server;

receiving from the client a first selected data source;

transmitting, in response to receiving the first selected data source, second data to the client, the second data being adapted to cause the geospatial data view panel to display a geospatial view based on the first selected data source;

transmitting, in substantially real-time, update data to the client based on updates received for the first selected data source;

the timeline panel being adapted to display one or more controls that, upon user selection, serve to initiate playback of a timeline enabled geospatial view in the geospatial data view panel, the timeline enabled geospatial view comprising a sequence of views spanning a period of time;

receiving from the client a second selected data source;

transmitting to the client third data adapted to cause the geospatial data view panel to display a consolidated geospatial view of the first selected data source and the second selected data source based on the second data and the third data;

in response to receiving a user selection of the position location data source:
  transmitting to the client fourth data adapted to cause the geospatial data view panel to display a pushpin corresponding to data provided by the position location data source that, upon user selection, displays additional information associated with the pushpin;

in response to receiving a user selection of a mission plan:
transmitting to the client fifth data adapted to update the displayed data source panel to display an expanded plan tree for the selected mission plan, one or more symbols associated with the selected mission plan, and the timeline panel.

10. A system as recited in claim 9, the GUI further comprising a filter panel comprising:
a string search control that, upon user selection, serves to filter data displayed in the geospatial data view panel based on a user entered string; and
a geographic search control that, upon user selection, serves to draw, based upon user input, a geometric shape overlaid on the geospatial data view panel to filter data displayed in the geospatial data view panel to exclude data outside of the geometric shape.

11. A system as recited in claim 9, wherein the hyperlink is one of a selectable text string, a button, and an image.

12. A non-transitory computer-readable medium including instructions stored thereon, the instructions, when executed by a processor, perform a method for presenting various data sources in a geospatial view, the method comprising:
displaying a graphical user interface (GUI) at a display coupled to the processor, the GUI comprising a geospatial data view panel, a data source panel, a timeline panel, and a toolbar comprising a map settings control that, upon user selection, displays one or more map source controls and one or more map layer controls, that upon user selection, updates the geospatial view displayed by the geospatial data view panel, an administration control that, upon user selection, displays user controls that, upon user selection, sets user access permissions based on user input, and a user account control that, upon user selection, allows the user to manage personal profile settings and preferences;
displaying, at the data source panel, at least three of a plurality of available data sources including a position location data source, a cyber intel source and a mission planner having one or more selectable mission plans, and, for one or more of the available data sources, one or more hyperlinks;
transmitting, upon user selection of one of the one or more hyperlinks, a request to a server indicating a first selected data source corresponding to the selected hyperlink, the server being coupled to a network coupled to the processor;
receiving first data from the server;
displaying, in the geospatial data view panel, a geospatial view based on the received first data;
receiving updated first data in substantially real-time from the server;
updating the geospatial view in substantially real-time based on the updated first data received from the server;
displaying, in the timeline panel, one or more controls that, upon user selection, serve to initiate playback of a timeline enabled geospatial view at the geospatial data view panel, the timeline enabled geospatial view comprising a sequence of views spanning a period of time;
transmitting, upon user selection of one of the one or more hyperlinks, a request to the server indicating a second selected data source corresponding to the selected hyperlink;
receiving second data from the server;
displaying, in the geospatial data view panel, a consolidated geospatial view of the first and second selected data sources based on the received first and second data;
in response to receiving a user selection of a mission plan:
updating the displayed data source panel to display an expanded plan tree for the selected mission plan,
updating the displayed geospatial data view panel to display one or more symbols associated with the selected mission plan, and
displaying the timeline panel; and
in response to receiving a user selection of the position location data source:
displaying, in the geospatial data view panel, a position location pushpin, and, in response to user selection of the position location pushpin, displaying additional information associated with the position location pushpin.

13. The computer-readable medium according to claim 12, the GUI further comprising a filter panel comprising:
a string search control that, upon user selection, serves filter data displayed in the geospatial data view panel based on a user entered string; and
a geographic search control that, upon user selection, serves to draw, based upon user input, a geometric shape overlaid on the geospatial data view panel to filter data displayed in the geospatial data view panel to exclude data outside of the geometric shape.

14. A computer-readable medium according to claim 12, wherein the hyperlink is one of a selectable text string, a button, and an image.

* * * * *